(12) United States Patent
Jakobsen et al.

(10) Patent No.: US 8,194,539 B2
(45) Date of Patent: Jun. 5, 2012

(54) SYSTEM AND METHOD FOR MONITORING CONGESTION IN COMMUNICATION SYSTEMS

(75) Inventors: Jens Jakobsen, Malmo (SE); Paul G. Bell, Cary, IL (US); Brian R. Poe, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 718 days.

(21) Appl. No.: 11/769,384

(22) Filed: Jun. 27, 2007

(65) Prior Publication Data

US 2009/0003210 A1    Jan. 1, 2009

(51) Int. Cl.
*H04J 1/16* (2006.01)
(52) U.S. Cl. ....................... 370/230; 370/252
(58) Field of Classification Search .......... 370/229–237, 370/241, 248, 252, 253
See application file for complete search history.

(56) References Cited

U.S. PATENT DOCUMENTS

| 2002/0136164 A1* | 9/2002 | Fukuda et al. ................. 370/230 |
| 2004/0073690 A1 | 4/2004 | Hepworth et al. |
| 2005/0094560 A1 | 5/2005 | Montes Linares |
| 2005/0175013 A1* | 8/2005 | Le Pennec et al. ...... 370/395.42 |
| 2006/0015639 A1* | 1/2006 | Taylor ........................... 709/235 |
| 2006/0114830 A1* | 6/2006 | Shimonishi et al. .......... 370/241 |
| 2006/0262720 A1* | 11/2006 | Charny et al. ................. 370/229 |
| 2007/0177625 A1* | 8/2007 | Morinaga et al. ............. 370/468 |

\* cited by examiner

*Primary Examiner* — Kwang B Yao
*Assistant Examiner* — Obaidul Huq
(74) *Attorney, Agent, or Firm* — Terri H. Smith; Valerie M. Davis; Kenneth A. Haas

(57) ABSTRACT

A system and method for monitoring congestion in a communication system including an external packet switched network. The communication system includes a plurality of interconnected host devices, such as base stations, consoles, zone controllers. To determine the presence of congestion on links between a pair of host devices, a series of sequential packets are transmitted between the pair. The sequentially transmitted packets are then monitor fluctuations in transmission delays and lost packets. These two criteria are used to identify congestion levels present on the various links in the communication system, and communications on the relevant interzone link are controlled based on the identified congestion level.

6 Claims, 3 Drawing Sheets

SYSTEM AND METHOD FOR MONITORING CONGESTION IN COMMUNICATION SYSTEMS

TECHNICAL FIELD OF THE DISCLOSURE

This disclosure relates generally to communication systems and more particularly to a system and method for monitoring congestion in communication systems.

BACKGROUND OF THE DISCLOSURE

Communication systems typically include a plurality of dispatch consoles and communication units, such as mobile or portable radio units, that are geographically distributed among various base sites and console sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites.

Many such communication systems use Internet Protocol (IP) to transport packet data representative of voice, video, data or control traffic between endpoints (or "hosts" in IP terminology). In such systems, host devices, including base stations, consoles, zone controllers, and in some instances, wireless mobile or portable radio units in different zones, are logically interconnected by various routers forming an IP network. Data is divided into IP packets called datagrams, which include addressing information (e.g., source and destination addresses) that enables the routers of the network to transport the packets to the specified destination(s).

Typically, systems utilizing IP to transport packet data include various congestion control protocols. For example, one well known congestion protocol, commonly referred to as explicit congestion notification (ECN) marking, is described in U.S. patent Pub. Ser. No. 2006/0015639. In systems utilizing ECN marking, exit routers for each of the zones in a communication system assess the availability of inter-zone resources in the IP network and update an ECN field in transmitted control packets to indicate the level of congestion.

However, many communication systems today also make use of an external packet switched network, such as Multi-Protocol Label Switching (MPLS), to reduce costs by reusing network infrastructure and bandwidth used by other types of networked systems. Such external packet switched networks typically do not provide any congestion notification or avoidance mechanisms appropriate for real-time voice applications. As a result, congestion within the external packet switched network cannot be readily detected by many communications systems, resulting in dropped packets when such congestion is present.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for monitoring and responding to congestion in a communication system incorporating an external packet switched network, and for ensuring that calls are reliably set up and audio quality is sufficient even in the presence of such congestion. The communication system includes a plurality of interconnected host devices, such as base stations, consoles, zone controllers. To determine the presence of congestion on links between a pair of host devices, a series of sequential packets are transmitted between the pair. The sequentially transmitted packets are then monitored to determine two individual criteria: fluctuations in transmission delays and lost packets. These two criteria are used to identify congestion levels present on the various links in the communication system, and communications on the relevant interzone link are controlled based on the identified congestion level.

Figure 1:
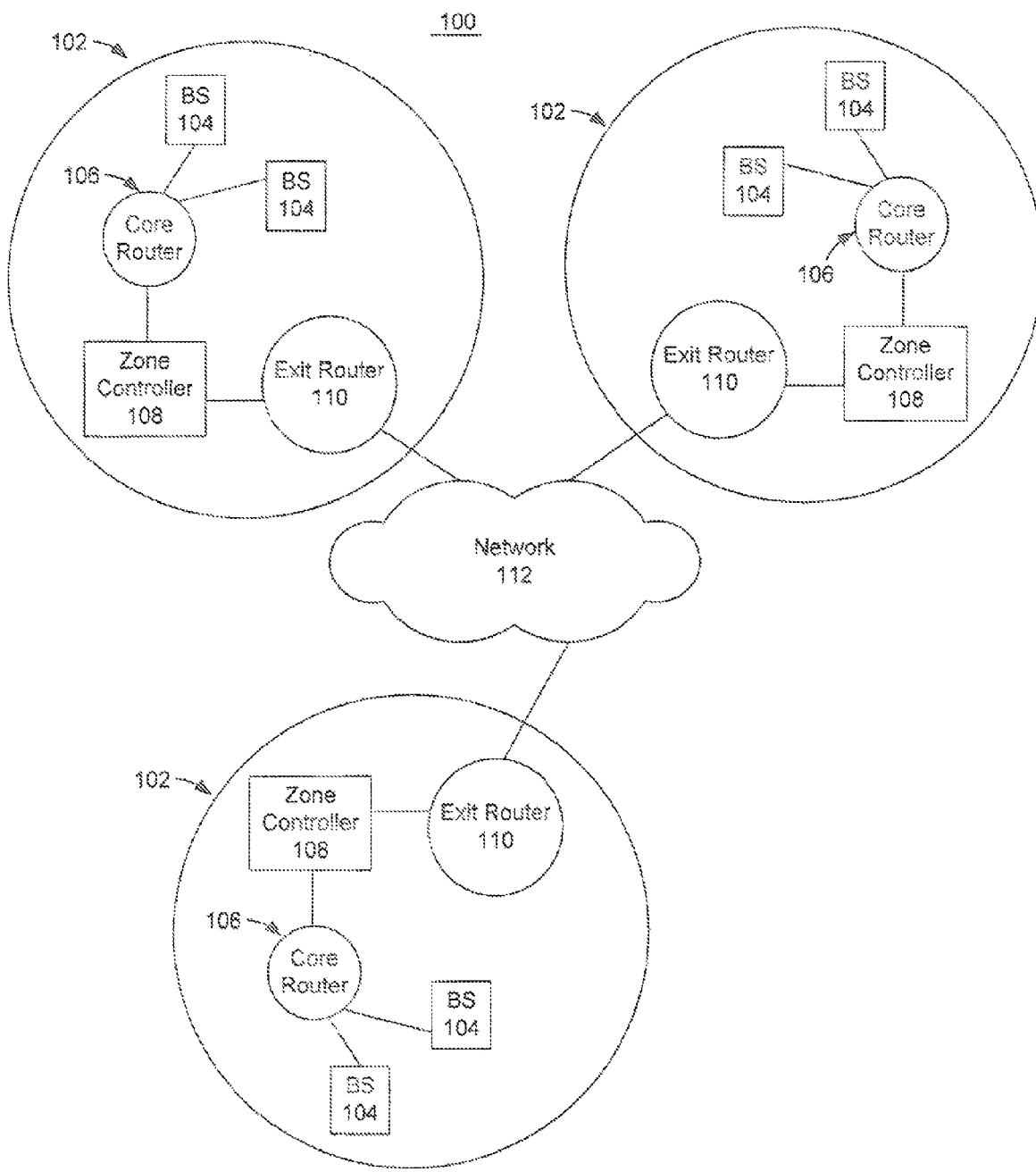
FIG. 1 shows one embodiment of a communication system in accordance with the present disclosure.

Let us now discuss the present disclosure in greater detail by referring to the figures below. FIG. 1 illustrates a communication system 100 having a plurality of zones 102. Each zone 102 comprises a plurality of base sites 104 in communication with a core router 106. Each base site 104 may comprise one or more repeaters that communicate, using wireless communication resources, with communication units (not shown) within a specific coverage area. The communication units may comprise mobile or portable wireless radio units, cellular radio/telephones, video terminals, portable computers with wireless modems, or any other wireless devices.

The core router 106 in each zone 102 is also coupled with a zone controller 108. The zone controller 108 provides overall call control for routing payload (e.g., voice, data, video, etc.) and control messages between and among the various base sites 104 within the corresponding zone 102. Each zone controller 108 is also coupled with an exit router 110. The exit routers 110 from each zone 102 are also coupled to one another via network 112 to allow for interzone communications. For purposes of this disclosure, a communication path between two zones is referred to herein as an interzone link, while communication paths within a zone are referred to herein as site links.

In one embodiment, the base sites 104, the zone controller 108, the exit router 110, and the network 112 may be coupled using T1 lines, E1 lines, fiber optic lines, wireless links, Ethernet links, or any other suitable means for transporting data between the various components. In accordance with the present disclosure, at least a portion of network 112 also includes an external packet switched network, such as MPLS (please define acronym), to provide additional communication resources for the network 112.

Of course, practitioners skilled in the art will appreciate that the system 100 may also include various other elements not shown in FIG. 1. For example, although only three zones 102 and two base sites 104 per zone are illustrated, the system 100 may include any number of zones 102, each having any number of base sites 104. Each zone 102 in the system 100 may also include one or more console sites. The system 100 may also be linked to a public switched telephone network (PSTN), a paging network, a facsimile machine, or the like. The communication system 100 may also be connected to a number of additional content sources, such as the Internet or various Intranets.

In accordance with the present disclosure, a series of sequential packets (also referred to herein as monitoring packets) are transmitted along each interzone link. The monitoring packets are then monitored, by each zone controller to determine two separate congestion criteria. More particularly, the monitoring packets are monitored to determine any fluctuations in the transmission delay (also known as jitter) of the monitoring packets as well as to determine whether any of the monitoring packets were lost during transmission. Based on these two criteria, the communication system is capable of assessing the congestion level of various interzone links in the system, regardless of the whether the interzone link is utilizing an external packet switched network.

Figure 2:
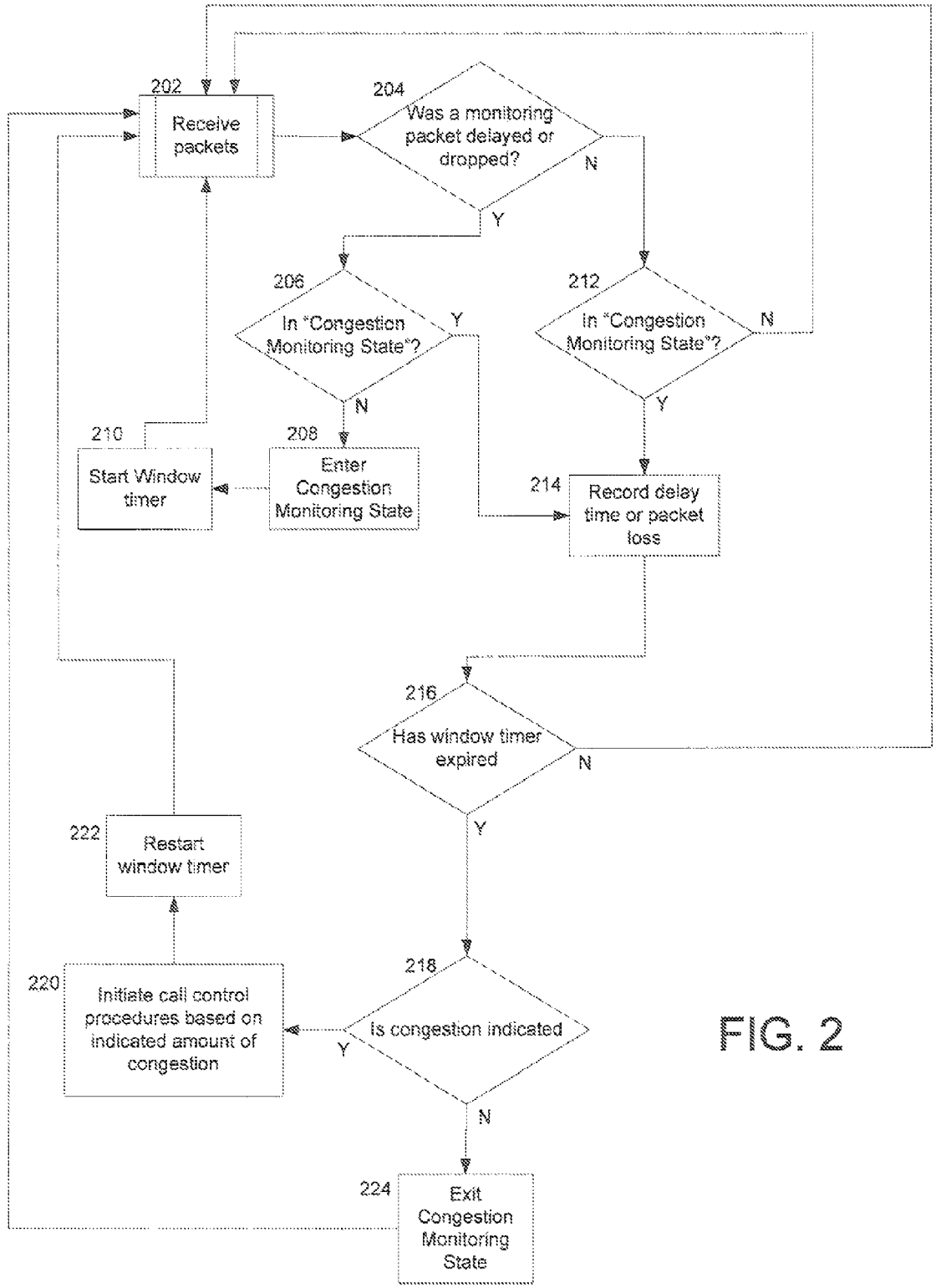
FIG. 2 shows one embodiment of a method for determining the presence of congestion in a communication system in accordance with the present disclosure.

Referring now to FIG. 2, one embodiment of a method for utilizing a series of monitoring packets in accordance with the present disclosure is described. A zone controller 108 receives a monitoring packet on an interzone link in step 202. In step 204, it is determined whether the monitoring packet was either delayed or dropped.

There are multiple ways in which the zone controller may determine the transmission delay for a particular monitoring packet. For example, in one embodiment, monitoring packets may be transmitted between zone controllers at predetermined known intervals. In this case, the amount of time that each packet is delayed may be determined by the receiving zone controller by simply comparing the time when a monitoring packet was received with the time when the monitoring packet was expected to be received.

Often times, however, it is not possible to transmit the monitoring packets at set intervals due to transmission priorities for other types of control packets. Thus, alternatively, the monitoring packets may employ the use of a time stamp. More specifically, each monitoring packet is sent along with a time stamp indicative of the time that the monitoring packet was transmitted. The receiving zone controller then measures the time stamp against its own internal clock to determine the delay.

For purposes of step 204, a monitoring packet may be considered to be delayed if the measured delay is greater than a predetermined amount of time. In another embodiment, the monitoring packet may be considered delayed if the measured delay is a certain amount greater than an expected delay on the interzone link (e.g., a certain amount greater than the typical transmission latency for the interzone link). In yet another embodiment, a monitoring packet may be considered delayed if the delay associated with the received monitoring packets is a predetermined amount of time greater than a previously received monitoring packet.

Similar to the case of monitoring packet delay times, loss of packets may also be determined using various methodologies. For example, if the monitoring packets are transmitted at predetermined intervals, the receiving zone controller may know when and/or how many packets are expected. If an expected monitoring packet is not received within a certain time frame, then it can be considered lost.

Alternatively, if the monitoring packets are not sent at predetermined intervals, but are sent intermittently, sequence numbers may be provided within each transmitted monitoring packet. In this case, when a monitoring packet with a specific sequence number is received by the zone controller 108, the zone controller 108 may compare that sequence number with that of previously received monitoring packets to determine if any packets were dropped.

In one embodiment, the monitoring packets are comprised of control packets that are also used by the system for other functions, such as resource request signals or resource grant signals. In this way, congestion may be monitored on a link without adding additional traffic on the link, which may be especially useful for links with low bandwidth. Of course, the communication system may also utilize dedicated monitoring packets that are used solely for monitoring the congestion criteria. It should of courses be understood that one set of monitoring packets may be used for determining both delay times and packet loss. Alternatively, however, the set of monitoring packets transmitted for use in determining delay times may be different than the monitoring packets transmitted for use in determining packet loss.

Regardless of whether it is determined in step 204 that a monitoring packet has been delayed or dropped, the next step determines whether the receiving zone controller is operating in a "congestion monitoring state." More particularly, if it is determined that a monitoring packet has either been delayed or dropped, it is then determined whether the zone controller 108 is currently operating in a congestion monitoring state in step 206. However, if it is determined that a monitoring packet has not been delayed or dropped in step 204, the process determines whether the zone controller 108 is currently operating in a congestion monitoring state in step 212.

Turning first to step 206, if the zone controller is determined not to be operating in a congestion monitoring state, the zone controller 108 enters the congestion monitoring state in step 208, begins a window timer in step 210, and returns to step 202 to receive the next packet. The window timer may be set to run for any predetermined period of time and essentially establishes a time window during which packet delay times and packet loss are continuously monitored. If, in step 206, it is determined that the zone controller 108 is already operating in a congestion monitoring state, process proceeds to step 214.

Turning now to step 212, if the zone controller is determined not to be operating in a congestion monitoring state, the process simply returns to step 202 without engaging the congestion monitoring state. However, if, in step 212, the zone controller is determined to be operating in a congestion monitoring state, the process proceeds to step 214.

In step 214, a record is made indicating an amount of time by which the current monitoring packet was delayed, or indicating whether the current monitoring packet was dropped. In step 216, it is determined whether the window timer has expired. If the window timer has not yet expired, the process returns to step 202 and the next monitoring packet is received. As a result of step 202 through 216, once a monitoring packet is determined to be either delayed or dropped, a congestion monitoring state is engaged and a window timer is started. During the time window, the zone controller 108 continues to monitor whether any monitoring packets have been delayed or dropped. Once, the window timer has expired, the process proceeds to step 216.

In step 216, it is determined whether there is an indication of congestion on the interzone link. As will be discussed in more detail with regards to FIG. 3, the amount of congestion indicated on an interzone link is related to the fluctuations in monitoring packet delay times (i.e., jitter) and the amount of monitoring packets lost during the time window.

If congestion is indicated in step 216, the zone controller initiates the appropriate call control procedures based on the amount of indicated congestion in step 218. The window timer is then reset in step 220, and the process returns to step 202 whereby monitoring packets are continued to be monitored during the next time window to again determine packet delays and drops. If congestion is not indicated in step 216, the zone controller exits the congestion monitoring state, and the process returns to step 202.

In the exemplary embodiment illustrated in FIG. 2, the zone controller does not enter a congestion monitoring state, and thus does not determine an amount of congestion based on packet jitter and drops, until a monitoring packet is found to have been either delayed or dropped. In this way, processing power in the zone controller is conserved during times when congestion is not present. However, one skilled in the art would understand that preset time windows may be monitored to determine packet delay times and losses on a continuous or periodic basis.

One skilled in the art would also understand that rather than obtaining packet delay times and losses during set time windows in order to assess congestion, the zone controller may alternatively be configured to determine packet delay times and losses for a specific number of previously received monitoring packets. The zone controller may also be configured to maintain a continuous value that is either incremented or decremented by a certain amount based on the characteristics of each subsequent monitoring packet.

Figure 3:
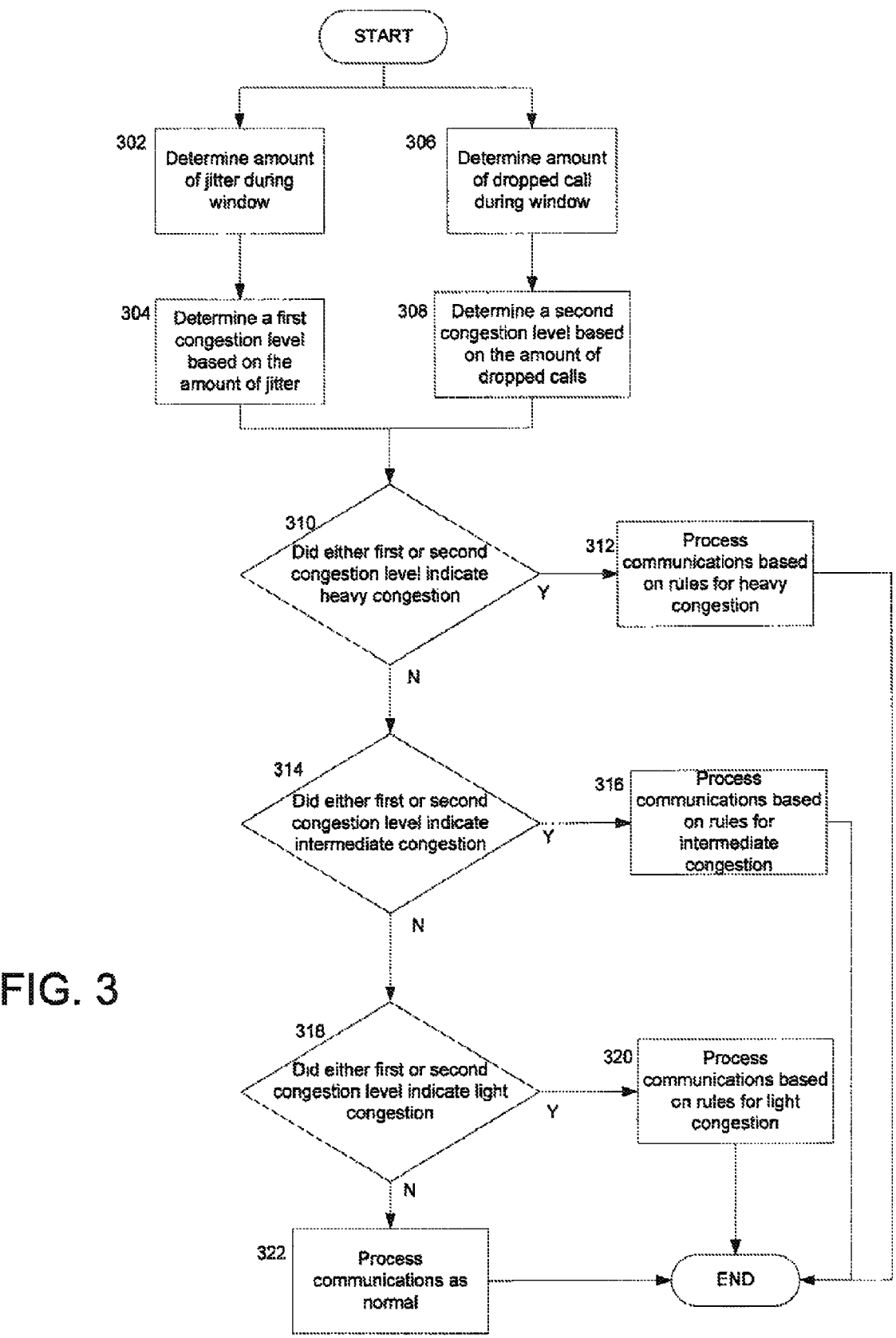
FIG. 3 shows one embodiment of a method for determining a congestion level in accordance with the present disclosure.

Turning to FIG. 3, one exemplary embodiment of a method is described for determining the amount of congestion on an interzone link based on the packet delays and losses obtained in FIG. 2. More particularly, FIG. 3 illustrates one exemplary method for performing steps 216 and 218. Thus, for purposes of this embodiment, it is assumed that both delay times and packet losses have already been determined for a set time window.

The amount of jitter for monitoring packets received during the time window is determined in step 302. More particularly, as noted above, the amount of jitter is determined based on the fluctuations in delays of the received monitoring packets. For example, in one embodiment, the amount of jitter may be based on the average of the delays that exceed a predetermined threshold during the time window. In another embodiment, the amount of jitter may be based on the amount of times that packet delays exceeded the predetermined threshold. In yet another embodiment, the amount of jitter may also be based on the percentage of packets that exceed a predetermined threshold. In each scenario described above, the predetermined threshold may be based on a set amount of delay. Alternatively, the predetermined threshold may be based on a certain amount of delay above a minimum delay level or expected latency delay for each particular link.

In step 304, a first congestion level is determined based on the amount of determined jitter. For example, in the simplest embodiment, if the jitter exceeds a predetermined threshold, then the interzone link is considered congested, whereas if the jitter does not exceed a predetermined threshold, then the interzone link is not considered congested. However, as would be understood by one skilled in the art, it would be desirable to allow for a plurality of different congestion levels based on the amount of jitter. Thus, for purpose of the embodiment described in FIG. 3, it is assumed that three threshold levels are utilized by the zone controller 108 in determining congestion levels based on jitter. More particularly, if the amount of jitter exceeds a first threshold, the interzone link is considered to be lightly congested. If the amount of jitter exceeds a second higher threshold, the congestion is considered intermediate. If the amount of jitter exceeds yet a third higher threshold, then the interzone link is considered to be heavily congested.

The amount of dropped monitoring packets during the time window is determined in step 306. The amount of dropped packets may be based either on the total number of dropped monitoring packets during the time window or based on a percentage of monitoring dropped packets to the total number of monitoring packets received during the time window.

In step 308, a second congestion level is determined based on the determined amount of dropped monitoring packets. Similar to step 304, congestion may simply be considered to be present if the amount of dropped monitoring packets exceeds a certain threshold level. However, as in the case described above with regards to jitter, for purpose of the embodiment described in FIG. 3, it is assumed that three threshold levels are utilized by the zone controller. More particularly, if the amount of dropped packets exceeds a first threshold, the interzone link is considered to be lightly congested. If the amount of dropped packets exceeds a second higher threshold, the congestion is considered intermediate. If the amount of dropped packets exceeds yet a third higher threshold, then the interzone link is considered to be heavily congested. It should of course be understood that steps 306 and 308 may be performed either concurrently with steps 302 and 304, or before or after steps 302 and 304.

Upon determining the first and second congestion levels, the zone controller determines a final congestion level based on whether either of the first or second congestion level was indicative of heavy congestion in step 310. Thus, if either the first or second congestion level is indicative of heavy congestion, then the zone controller 108 begins controlling communications on that interzone link based on a set of rules for heavy congestion in step 312. This may involve, for example, permitting transmission of emergency calls while rejecting any follow-on push-to-talk requests on existing group calls. This may also involve terminating a portion or percentage of the lowest priority existing calls (e.g., individual and telephony calls). For example, in the embodiment described in FIG. 3, if it is determined that there is heavy congestion for a certain time window, a predetermined portion or percentage of the lowest priority calls may be terminated. If there is still heavy congestion detected upon a subsequent time window, then additional lowest priority calls may be terminated at that time. This process would repeat and a portion or percentage of the lowest priority calls may continue to be terminated for each subsequent time window until a lower congestion level is detected. As a result of this process, the audio quality of the highest priority calls (such as emergency calls) is preserved.

If neither the first nor the second congestion levels indicate heavy congestion, it is determined if either the first or second congestion levels indicate intermediate congestion in step 314. If either is indicative of intermediate congestion, then the zone controller begins controlling communications on the interzone link based on a set of rules for intermediate congestion in step 316. This may involve, for example, permitting transmission of emergency calls and allowing any follow-on push-to-talk requests on existing group calls, but blocking and/or queuing new group calls.

If neither the first or second congestion levels indicate light congestion, it is determined if either the first or second congestion levels indicate light congestion in step 318. If either is indicative of intermediate congestion, then the zone controller begins controlling communications on the interzone link based on a set of rules for light congestion in step 318. This may involve, for example, providing a warning to a network manager that some congestion has been identified on the interzone link.

If neither the first or second congestion level indicates light congestion, then it is determined that there is no congestion and communications on the interzone link are processed as normal in step 320. If any calls had been queued due to the detection of congestion during prior time windows, this step may also involve processing at least a portion of the previously queued calls. For example, in one embodiment, upon determining that there is no congestion for a time window, a portion of the calls that were previously queued may be processed, preferably in order of their priority from highest to lowest. If no congestion is again detected during the subsequent time window, then additional highest priority calls would be processed at that time. The process would repeat until the queue is empty, or until congestion is detected.

Thus, in the illustrated embodiment, the final congestion level of each interzone link is determined based on the highest level of congestion indicated by either the first congestion level (based on jitter) or the second congestion level (based on the amount of dropped packets). Of course, other methods may also be used and either one of the first or second congestion levels may be weighted more or less than the other.

By means of the aforementioned disclosure, each zone controller 108 can manage communications within the system 100 based on congestion that occurs in the IP network as well as in the external packet switched network. As a result, there is a significant decrease in the risk that transmitted communications would be dropped due to the presence of undetected congestion.

Further advantages and modifications of the above described system and method will readily occur to those skilled in the art. For example, the present disclosure may be used to continuously or periodically monitor congestion levels on each interzone link. Alternatively, the present disclosure may be used to monitor congestion on an interzone link only during a call on the interzone link. The monitoring packets described herein may also be dedicated packets used solely for monitoring congestion or control packets used by the system for other functions, such as resource request signals or resource grant signals.

Additionally, while the embodiment described above has been illustrated in regards to congestion monitoring for interzone links, it is understood that the present disclosure may also similarly be applied to site links between a zone controller and a site controller (either in the same zone or in different zones).

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for determining congestion in a communication system including a plurality of zone controllers logically connected by one or more paths in a packet switched network, the method comprising:
   at a zone controller:
      receiving a plurality of monitoring packets transmitted from one other zone controller;
      monitoring transmission delay times for the plurality of monitoring packets;
      determining a first congestion level based on the transmission delay times;
      monitoring an amount of monitoring packets dropped for the plurality of monitoring packets;
      determining a second congestion level based on the amount of monitoring packets dropped; and
      determining a final congestion level based on the first congestion level and the second congestion level,
      whereby communications between the zone controller and the one other zone controller are controlled based on the final congestion level;
   upon determining that the final congestion level is indicative of heavy congestion, controlling communications between the zone controller and the one other zone controller using a first set of rules that includes at least one of (a) permitting transmission of a new call only if the new call is a high priority call (b) rejecting any follow-on push-to-talk requests for existing calls, and (c) terminating at least a portion of the existing calls;
   upon determining that the final congestion level is indicative of intermediate congestion, controlling communications between the zone controller and the one other zone controller using a second set of rules that includes at least one of (a) permitting transmission of a new call only if the new call is a high priority call, and (b) queuing a new call if the new call is not a high priority call; and
   upon determining that the final congestion level is indicative of light congestion, controlling communications between the zone controller and the one other zone controller using a third set of rules that includes providing a warning to a network manager that congestion has been identified.

2. The method of claim 1 further comprising determining an amount of jitter for the plurality of monitoring packets based on fluctuations in the transmission delay times; and wherein determining a first congestion level comprises determining a first congestion level based on the amount of jitter.

3. The method of claim 2 wherein determining the first congestion level comprises determining the first congestion level based on a comparison of the amount of jitter with at least one predetermined congestion level threshold; and wherein determining the second congestion level comprises determining the second congestion level based on a comparison of the amount of packets dropped with at least one predetermined congestion level threshold.

4. The method of claim 1 wherein monitoring transmission delay times comprises monitoring transmission delay times for a predetermined window of time; and wherein monitoring the amount of monitoring packets dropped comprises monitoring the amount of monitoring packets dropped during the predetermined window of time.

5. The method of claim 1 wherein determining a final congestion level comprises setting the final congestion level to be indicative of the highest level of congestion indicated by either the first congestion level or the second congestion level.

6. The method of claim 1 further comprising, upon determining that the final congestion level is indicative of no congestion, controlling communications between the zone controller and the one other zone controller using a fourth set of rules that includes processing at least a portion of new calls that were previously queued.

* * * * *